United States Patent
Neumann et al.

(10) Patent No.: US 8,849,041 B2
(45) Date of Patent: Sep. 30, 2014

(54) DATA RECOGNITION IN CONTENT

(75) Inventors: Jan Neumann, Arlington, VA (US);
Evelyne Tzoukermann, Silver Spring, MD (US); Amit Bagga, Basking Ridge, NJ (US); Oliver Jojic, Annandale, VA (US); Bageshree Shevade, Springfield, VA (US); David Houghton, Brattleboro, VT (US); Corey Farrell, Lansdowne, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 122 days.

(21) Appl. No.: 13/487,543

(22) Filed: Jun. 4, 2012

(65) Prior Publication Data

US 2013/0322765 A1    Dec. 5, 2013

(51) Int. Cl.
*G06K 9/00* (2006.01)

(52) U.S. Cl.
CPC ........................................ *G06K 9/00* (2013.01)
USPC ........... 382/197; 382/103; 382/176; 382/192; 382/276

(58) Field of Classification Search
CPC ..... G06K 9/48; G06K 9/222; G06K 9/00221; G06K 9/00771; G06K 9/00624; G06K 9/00664; G06K 9/6292; G06K 9/00671; G06K 9/00711; G06K 9/00758; H04N 13/026; H04N 21/2365; H04N 21/472; H04N 7/147; H04N 9/79; H04N 21/44008; H04N 19/00139; H04L 1/0042; G06T 2207/10021; G11B 27/28; G10L 15/26; G10L 15/265; G06F 17/30843; G06F 17/30858; G06F 3/017; G06F 17/30784; H04M 11/085; A63F 2300/1081; H04H 60/59

USPC .......................... 382/103, 176, 192, 276, 303
See application file for complete search history.

(56) References Cited

U.S. PATENT DOCUMENTS

| | | | |
|---|---|---|---|
| 4,817,175 A | 3/1989 | Tenenbaum | |
| 6,006,241 A | 12/1999 | Purnaveja | |
| 6,266,442 B1 * | 7/2001 | Laumeyer et al. | 382/190 |
| 6,611,628 B1 | 8/2003 | Sekiguchi | |
| 6,614,930 B1 | 9/2003 | Agnihotri | |
| 6,678,395 B2 | 1/2004 | Yonover | |
| 6,898,567 B2 * | 5/2005 | Balasuriya | 704/231 |
| 8,085,990 B2 * | 12/2011 | Ofek | 382/113 |

(Continued)

OTHER PUBLICATIONS

Internet Article—Hulu 'Face Match' feature attaches an actor's entire history to their mug by Richard Lawler posted Dec. 8, 2011, www.engadget.com/2011/12/08/hulu-face-match-feature-attaches-an-actors-entire-history-to.

(Continued)

*Primary Examiner* — Vu Le
*Assistant Examiner* — Aklilu Woldemariam
(74) *Attorney, Agent, or Firm* — Banner & Witcoff, Ltd.

(57) ABSTRACT

The disclosure relates to recognizing data such as items or entities in content. In some aspects, content may be received and feature information, such as face recognition data and voice recognition data may be generated. Scene segmentation may also be performed on the content, grouping the various shots of the video content into one or more shot collections, such as scenes. For example, a decision lattice representative of possible scene segmentations may be determined and the most probable path through the decision lattice may be selected as the scene segmentation. Upon generating the feature information and performing the scene segmentation, one or more items or entities that are present in the scene may be identified.

20 Claims, 12 Drawing Sheets

(56) References Cited

U.S. PATENT DOCUMENTS

| | | | |
|---|---|---|---|
| 8,244,848 B1* | 8/2012 | Narayanan et al. | 709/223 |
| 8,478,050 B2* | 7/2013 | Oami et al. | 382/205 |
| 8,572,129 B1* | 10/2013 | Lee et al. | 707/798 |
| 2006/0159442 A1* | 7/2006 | Kim et al. | 396/236 |
| 2006/0248569 A1* | 11/2006 | Lienhart et al. | 725/135 |
| 2007/0076920 A1* | 4/2007 | Ofek | 382/113 |
| 2007/0092143 A1* | 4/2007 | Higgins | 382/228 |
| 2007/0135999 A1* | 6/2007 | Kolatt | 702/19 |
| 2007/0156720 A1* | 7/2007 | Maren | 707/100 |
| 2008/0005091 A1 | 1/2008 | Lawler | |
| 2008/0005166 A1 | 1/2008 | Cragun | |
| 2008/0071750 A1 | 3/2008 | Schloter | |
| 2008/0118106 A1* | 5/2008 | Kilambi et al. | 382/103 |
| 2010/0238262 A1* | 9/2010 | Kurtz et al. | 348/14.01 |
| 2010/0303293 A1* | 12/2010 | Caduff | 382/103 |
| 2011/0150275 A1* | 6/2011 | Tong et al. | 382/103 |

OTHER PUBLICATIONS

Internet Article—Comcast, Shazam offer glimpse at future by Steve Donohue posted May 22, 2012, www.fiercecable.com/story/comcast-shazam-offer-glimpse-future/2012-05-22.

Internet Article—Chapter 1. FT-SDK: Detection User's Guide, web.archive.org/web/20100403222249/http://www.pittpatt.com/products/ . . . /detection_users_guide.html, Dec. 1995-Jul. 2000.

Internet Article—Internet Article—Chapter 2. FT-SDK: Tracking User's Guide, web.archive.org/web/20100405030148/http://www.pittpatt.com/products/ . . . /tracking_users_guide.html, 2004-2010.

Steve Young et al., The HTK Book (for HTK Version 3.1) © Copyright 1995-1999 Microsoft Corporation, 271 pages.

Brendan F. Klare et al., Face Recognition Performance: Role of Demographic Information, 14 pages, Dec. 8, 2011.

* cited by examiner

DATA RECOGNITION IN CONTENT

BACKGROUND

As communication and interactive technologies increasingly rely on more information-rich types of media to enhance their popularity and/or capabilities, there is an increasing need to process such information. Processing may be configured to, for example, capture, analyze, retrieve, and/or distribute the massive amount of information contained within the types of media used within these technologies to help users sift through the content and find information about the media that will be of most interest. However, due to the massive amount of media and information within media (e.g., a single day's worth of television programming may contain thousands and thousands of hours of content, addressing thousands and thousands of topics, narrative themes, etc.), attempting to capture, analyze, and/or distribute information may be extremely difficult. Therefore, the processing of certain types of information-rich media files is often performed using manual judgments and determinations. For example, a textual description of actors, characters or other entities appearing in an episode of "Friends" may be manually generated. That description can then be provided to users so they may be able to learn which actors, characters or other entities appear in the episode.

This and other approaches, however, have drawbacks. For example, the description may be lacking; a user may want to know which actors, characters or other products or entities are appearing in a particular scene or which actors, characters or other entities are speaking in a particular scene. Thus, there remains an ever-present need to provide more useful information and tools to users, for example, to provide for the capture, analysis and distribution of information related to media with greater functionality, accuracy and speed.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects of this disclosure relate to methods and systems for recognizing information present in a scene of content. In one or more arrangements, recognizing information, such as, entities, present in a scene of content may include performing scene segmentation, identifying a set of entities that may be present in video content, identifying various confidence value vectors representative of features of a scene, and determining a vector of presence identifiers based on an analysis of the confidence value vectors. Each identifier in the vector of presence identifiers may define whether an entity in the set of entities is present in the first scene. In some embodiments, the vector of presence identifiers may be used to identify which entities are present in the scene. Additionally, in some variations, a salience measurement may be used to further identify which entities are present in the scene and also salient to the scene.

In another aspect, confidence value vectors may be from different sources, such a face recognition process or a voice recognition process. For example, in one or more arrangements, a voice recognition process may determine a confidence value vector using a method that includes calculating acoustic features from one or more of audio, detecting an occurrence of a phone (e.g., utterance of a phoneme) based on the acoustic features, calculating confidence values for each entity that may be present in the content, and determining the confidence value vector at least in part by selecting the values from the confidence values for each entity that may be present in the content.

The details of these and other embodiments of the present disclosure are set forth in the accompanying drawings and the description below. Other features and advantages will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
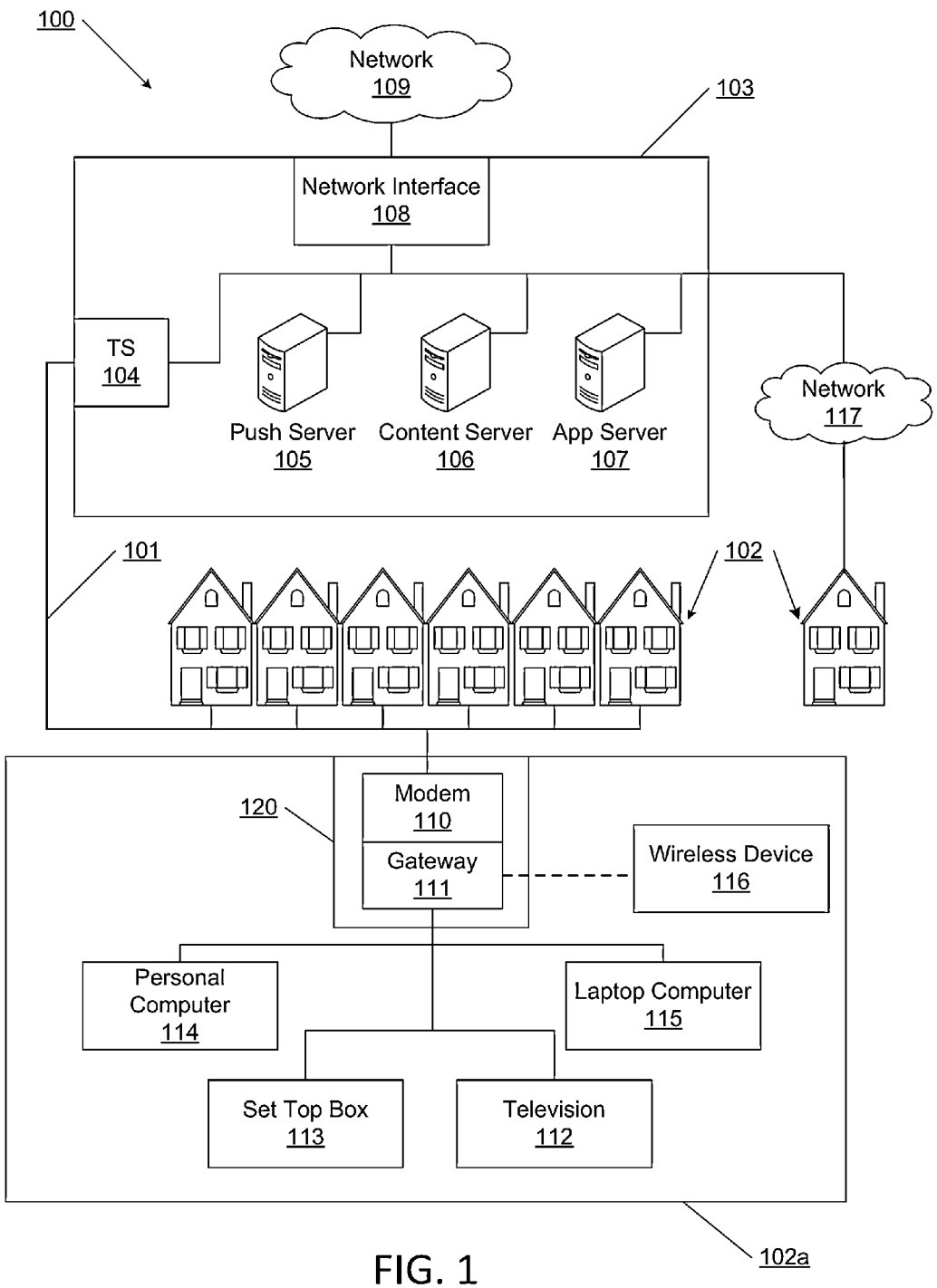
FIG. 1 illustrates an example network according to one or more aspects described herein.

FIG. 1 illustrates an example network 100 on which many of the various features described herein may be implemented.

Network 100 may be any type of information distribution network, such as satellite, telephone, cellular, wireless, optical fiber network, coaxial cable network, and/or a hybrid fiber/coax (HFC) distribution network. Additionally, network 100 may be a combination of networks. Network 100 may use a series of interconnected communication lines 101 (e.g., coaxial cables, optical fibers, wireless, etc.) and/or some other network 117 (e.g., the Internet) to connect an end-point to a central office or headend 103. Example end-points are illustrated in FIG. 1 as premises 102 (e.g., businesses, homes, consumer dwellings, etc.) The central office 103 may transmit information signals onto the lines 101, and each premises 102 may have a receiver used to receive and process those signals.

There may be one line 101 originating from the central office 103, and it may be split a number of times to distribute the signal to various homes 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a termination system (TS) 104, such as a cable modem termination system (CMTS) in a HFC network, which may be a computing device configured to manage communications between devices on the network of lines 101 and backend devices such as servers 105-107 (to be discussed further below). The TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems or other user devices at the various premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data and/or commands to the various homes 102 in the network (or more specifically, to the devices in the homes 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user and/or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the premises 102. Another application server may be responsible for formatting and providing data for an interactive service being transmitted to the premises 102 (e.g., chat messaging service, etc.).

An example premises 102a may include an interface 120. The interface 120 may comprise a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired device offering similar functionality. The interface 120 may also comprise a gateway interface device 111 or gateway. The modem 110 may be connected to, or be a part of, a gateway interface device 111. The gateway interface device 111 may be a computing device that communicates with the modem 110 to allow one or more other devices in the premises to communicate with the central office 103 and other devices beyond the central office. The gateway 111 may comprise a set-top box (STB), digital video recorder (DVR), computer server, or any other desired computing device. The gateway 111 may also include (not shown) local network interfaces to provide communication signals to devices in the premises, such as televisions 112, additional STBs 113, personal computers 114, laptop computers 115, wireless devices 116 (wireless laptops and netbooks, mobile phones, mobile televisions, personal digital assistants (PDA), etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
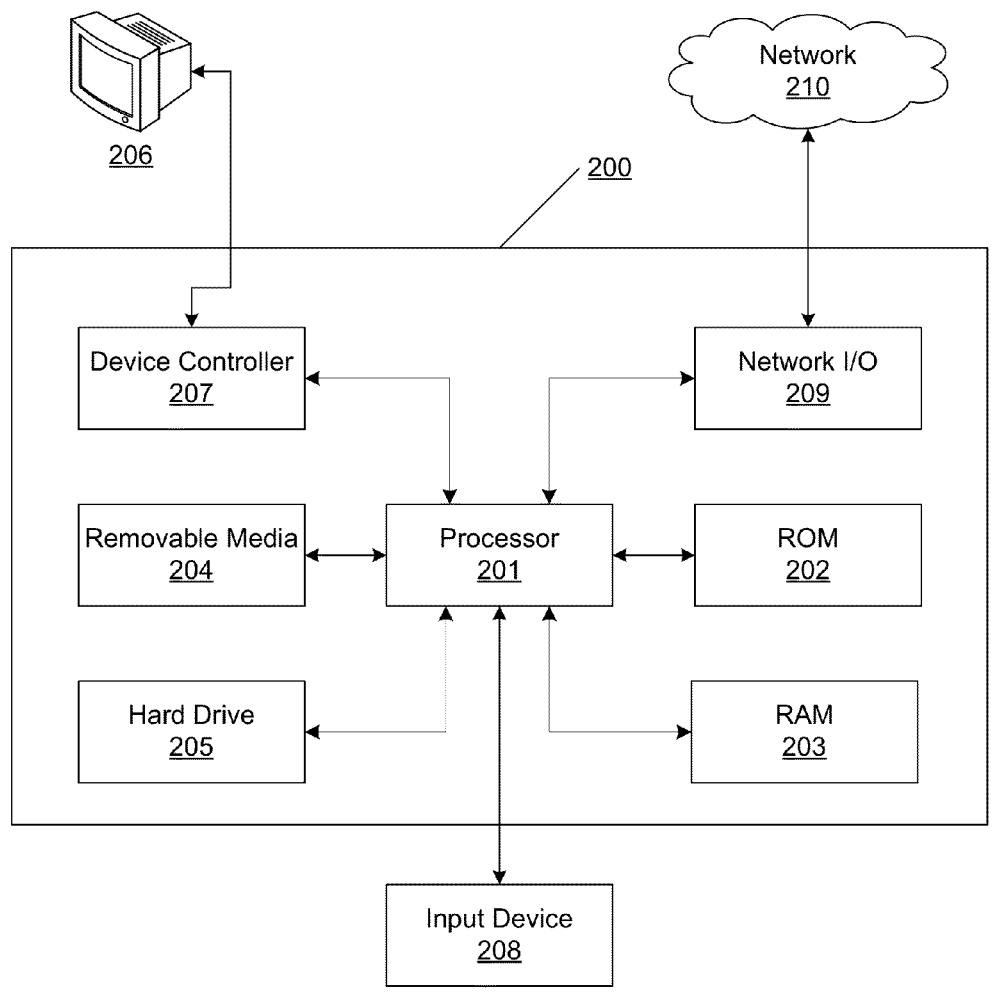
FIG. 2 illustrates an example computing device on which the various elements described herein may be implemented according to one or more aspects described herein.

FIG. 2 illustrates an example computing device on which various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines and/or networks illustrated in FIG. 1, or any other desired network.

The FIG. 2 example is an illustrative hardware and/or software configuration for a computing device. Modifications may be made to add, remove, combine, divide, etc. components as desired. Additionally, the components illustrated may be implemented using basic computing devices and components, and the same components (e.g., processor 201, storage 202, user interface, etc.) may be used to implement any of the other computing devices and components described herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), application-specific integrated circuits (ASIC), and the like. Particular data structures may be used to more effectively implement one or more aspects of the invention, and such data structures are contemplated within the scope of computer executable instructions and computer-usable data described herein.

Figure 3:
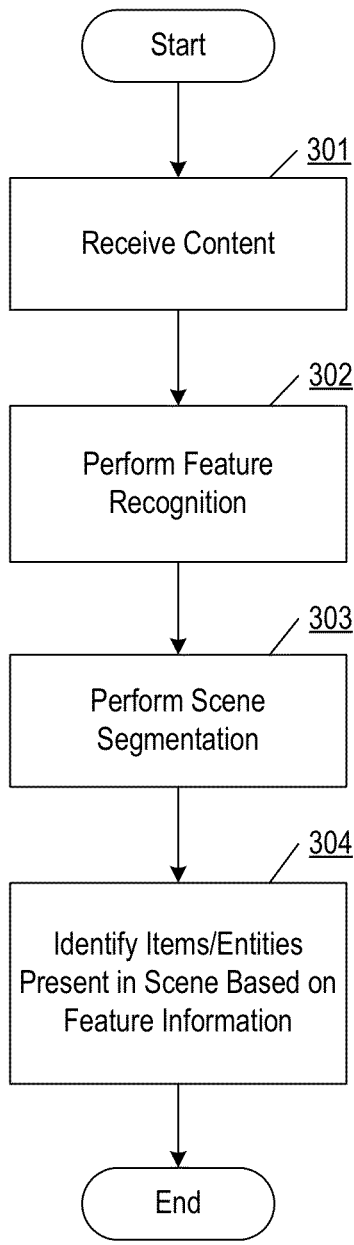
FIG. 3 illustrates an example method of recognizing items in content according to various aspects described herein.

Various aspects of this disclosure relate to providing a method for recognizing or identifying entities, such as an actor or actress, that are present in an interval of content, such as audio-visual content. FIG. 3 illustrates an example method of recognizing items in content according to various aspects described herein. The method itself may be performed by one or more computing devices, such as push server 105, content server 106, or application server 107 of FIG. 1.

Referring to FIG. 3, at step 301, a computing device may receive content for processing. In some arrangements, the content may include one or more frames of video content, such as a television show, movie, streaming video (e.g., streaming via the Internet or other network), etc. The content may comprise video, audio, text and/or other data. For example, content may include audio data, such as a song or audio for corresponding video content. Additionally, in some embodiments, the content may include textual data, such as a transcript for the video content, closed-captioning data for the video content, or the like. For example, in one or more arrangements, the content may be a stream of video and a stream of audio, or a stream having both audio and video. Additionally, as part of the content, the video and/or audio may be accompanied by textual data describing the video or audio (e.g., closed captioning data, a transcript or some other descriptive text for the video or audio). Other data may also be received, such as data identifying the cast members of the video content (e.g., a listing of actors and actresses in the television program); data identifying the names of the characters in the video content; data identifying products, places, buildings, and other items within or referenced by the content; or data that otherwise identifies items and things that potentially could be detected in the content.

At step 302, a computing device may perform feature recognition on the content. While example details of feature recognition will be discussed below in connection with FIGS. 4-6, in one or more arrangements, feature recognition may include using various feature recognition or feature extraction techniques, such as face recognition and/or voice recognition. Feature recognition may also include text recognition based on an analysis of closed captioning data or a transcript of the content. In some embodiments, face recognition may include determining a confidence value that a particular cast member of the television program is present. The orientation of the face may also be detected. Voice recognition may include categorizing the audio into different categories, such as by categorizing by phoneme or phone (e.g., utterance of a phoneme), or some other phonetic categorization. Voice recognition may also include determining a confidence value that a particular cast member is speaking based on the categorization.

Figure 7:
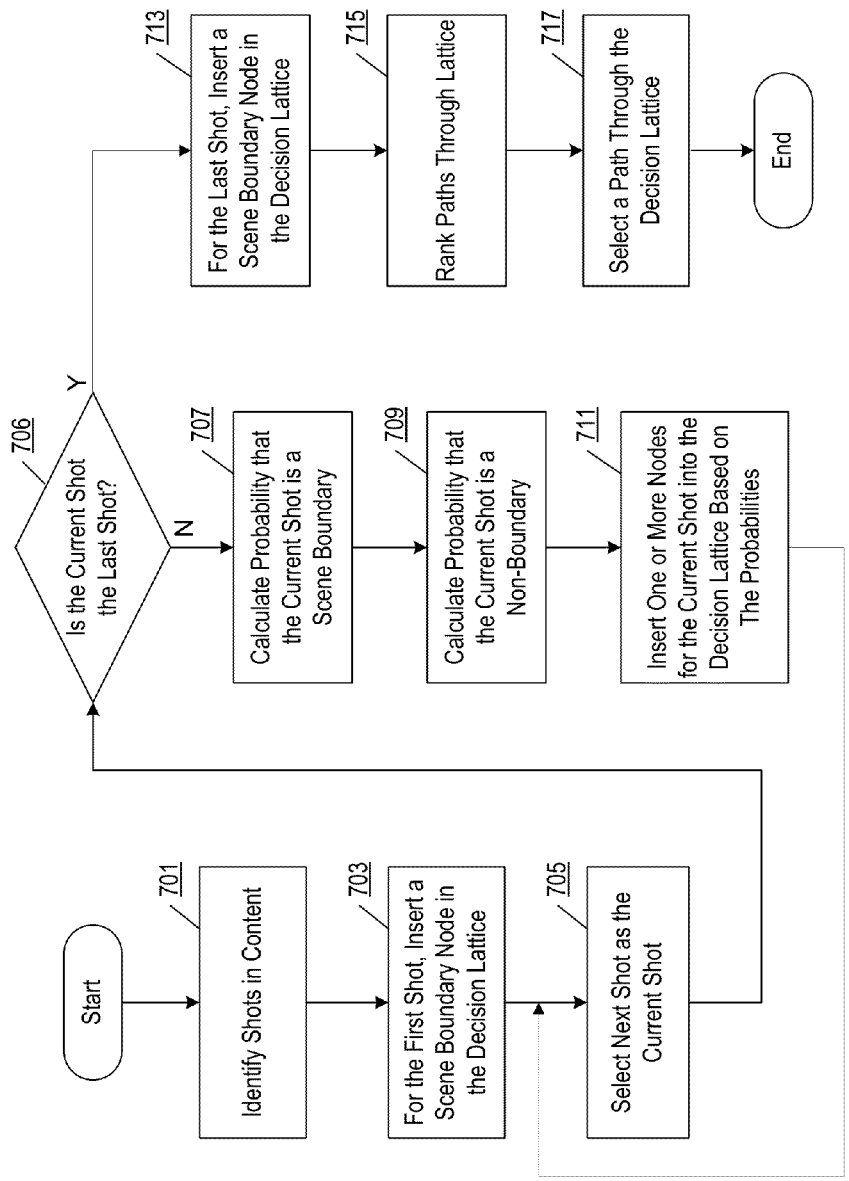
FIG. 7 illustrates an example method of scene segmentation according to one or more aspects described herein.

At step 303, a computing device may perform scene segmentation on the content. An example method is shown in FIG. 7 and discussed below. With respect to video content, scene segmentation may include identifying shots of the video content and grouping the shots into scenes (or otherwise placing the shots into a collection of shots). A shot can be a sequence of frames without a discontinuity in the viewpoint, such as, for example, a continuous sequence of frames filmed by a single camera. For example, if the video is a video program that includes a dialogue between two actors, one shot may be when the first actor is speaking and a second shot may be when the second actor is speaking. Each occurrence of a shot may be determined by locating the shot boundaries. A shot boundary may occur when the video transitions from the shot used when the first actor is speaking to the shot used when the second actor is speaking. By analyzing each frame of the video and comparing it to other frames (e.g., an adjacent frame), the shot boundaries may be located.

Upon identifying some or all of the shots in the video content, the shots may be grouped into coherent scenes. For example, with respect to the above example of a video program that includes a dialogue between two actors, the dialogue could be considered to be a single scene. Therefore, the shots used when the first or second actor is speaking may be grouped together as part of the scene. An example of identifying shots and grouping shots into scenes will be discussed further below in connection with FIG. 7.

Further, in some variations, step 303 may be performed prior to step 302, and step 303 may be preceded by additional feature recognition. For example, additional feature recognition may be performed that is specific to the types of features used or found in scene segmentation. Then, at step 302, which may occur after scene segmentation, feature recognition may be performed in an iterative process for each scene identified in step 303 (e.g., perform face and voice recognition for the first scene, perform face and voice recognition for the second scene, etc.). The scene-specific feature recognition may result in scene-specific face recognition data and scene-specific voice recognition data. In some arrangements, the face recognition data, scene-specific recognition data, voice recognition data, and/or scene-specific voice recognition data may be used as input to step 304. Scene-specific face recognition data may include a confidence value for each cast member of a video program, and each confidence value may represent a probability derived through face recognition that the corresponding cast member is present in the current scene. Scene-specific voice recognition data may be similarly structured, and each confidence value may represent a probability derived through voice recognition that the corresponding cast member is present in the current scene. Various other types of entity recognition may be used.

At step 304, a computing device may identify which items, things and/or entities are present or not present in a scene based on feature information. In some arrangements, identifying an entity may include analyzing the different feature recognition data (e.g., the face recognition data, voice recognition data, etc.) and determining a set of individuals (e.g., one or more actors or actresses from the cast list of the video program) that are present in the current scene. For example, the confidence values of the scene-specific face recognition data and scene-specific voice recognition data may be processed through a classification process to identify which cast members are present in a particular (e.g., current) scene. In some variations, the classification process may result in a listing of identifiers, where each identifier corresponds to one of the cast members of the video program and the value of each identifier identifies whether the corresponding cast member is present or not-present in the current scene (e.g., cast member A is present, cast member B is not present, cast member C is present, etc.). An example of identifying which items or entities are present or not present in a scene based on feature information will be discussed below in connection with FIG. 9.

Figure 4:
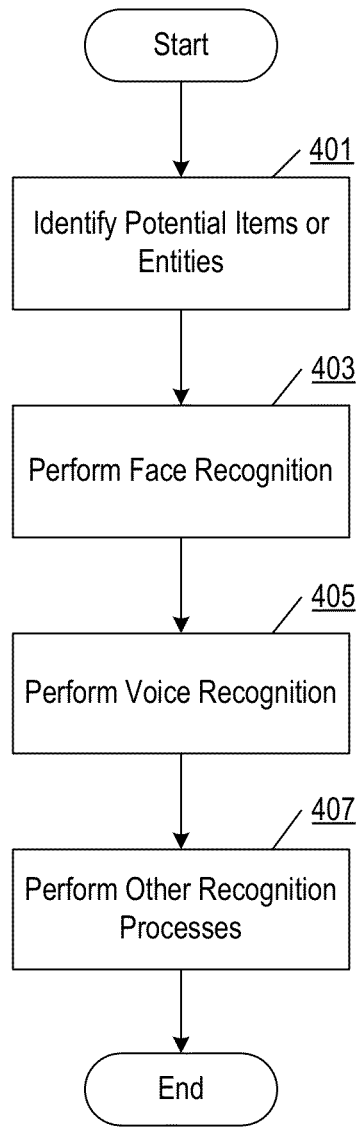
FIG. 4 illustrates an example method of feature recognition according to one or more aspects described herein.

As discussed above in connection with step 302 of FIG. 3, a computing device may perform feature recognition on content. FIG. 4 illustrates an example method of feature recognition according to one aspect of the disclosure. At step 401, the items, such as entities, of the content may be identified. In some arrangements, a cast list may be provided that includes the names of the actors or actresses in the content and/or the character names for the actors or actresses in the content (e.g., the content may include entities named Ross, Phoebe, Joey and Monica, or other items such as buildings, locations, or products). In some aspects, a list may be determined based on an analysis of a transcript, metadata, or other data describing the content. For example, a transcript may be analyzed to determine the identities of items and/or entities that speak in the content.

At step 403, facial recognition may be performed. In some arrangements, facial recognition may determine presence and/or identity of faces in the content. Facial recognition may also determine one or more vectors of confidence values. Each vector of confidence values may include a probability for each potential entity that provides a measure of whether the potential entity is present or absent. An example method of facial recognition will be discussed below in connection with FIG. 5A and FIG. 5B.

At step 405, voice recognition may be performed. Voice recognition may determine presence and/or identity of speakers in the content. Similar to facial recognition, voice recognition may also determine one or more vectors of confidence values. An example method of voice recognition will be discussed below in connection with FIG. 6.

At step 407, other recognition processes may be performed. Each type of recognition process can generate its own data indicating who/what entities are recognized, and with what degree of confidence. For example, various types of textual, location, or product recognition may be used. Textual recognition may include, for example, analysis of a transcript and/or closed captioning data. In some arrangements, the transcript/closed captioning data may be aligned with the content or each other. Further, frames of the video content may be processed to recognize text that appears on screen, and entity recognition may be performed based on the recognized text. For example, recognized words may be compared to the list of potential entities in order to recognize whether names of an entity are present or not present (e.g., compare an on-screen name, such as a game show contestant's name tag, to the list of potential entities to determine whether the recognized on-screen name is the same or similar to one of the list of potential entities). Music or other audio may be processed through a recognition process to recognize the song title and/or name of the band or singer (and to what degree of confidence).

Figure 5A:
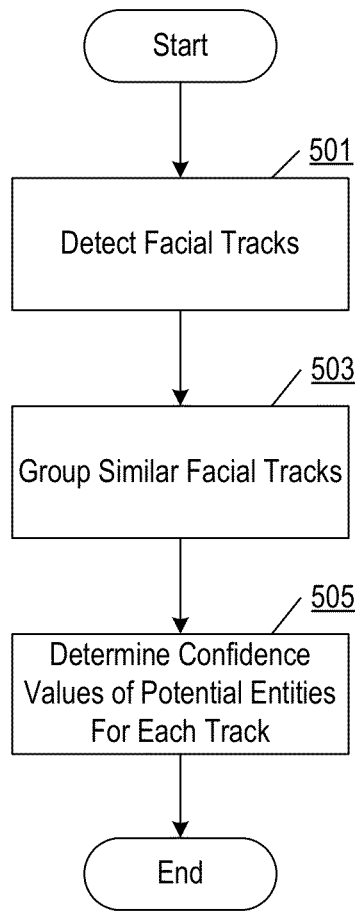
FIG. 5A illustrates an example method of facial recognition according to various aspects described herein.

FIG. 5A illustrates an example method of facial recognition. In some arrangements a face recognition software development kit (SDK) may be used for face recognition (e.g., Pittsburgh Pattern Recognition). In others, proprietary extensions to a face recognition SDK may be created and used for face recognition.

At step 501, one or more facial tracks may be detected in the content. A facial track may include temporally coherent locations in frames of the content where faces are likely present. For example, a face candidate location may be identified based on color, edge or other suitable property of the video frames, and face candidate locations may be included in a particular facial track where the face candidate locations of two or more frames have a similar appearance, shape and/or location. In some variations, similarity between two or more face candidate locations may be determined based on temporal smoothness (e.g., measuring the amount an edge or color changes over time), appearance similarity measurements (e.g., measuring how similar the shape a face candidate is to another frame's face candidate), and the like. Such measurements may be calculated and used to group candidate locations into a track (e.g., candidate locations satisfying a temporal smoothness and/or appearance similarity constraint may be grouped into a track). Properties related to the face may also be detected for each facial track, such as, for example, the location of the face, the size of the face, a location of an eye, a location of a nose, and an estimated orientation of the face. It may be common to detect a large number of facial tracks. For example, 500-700 facial tracks may be detected in a 45 minute video program, with each facial track spanning 50 to 300 frames.

At step 503, similar facial tracks may be grouped together. In some arrangements, similarity relationships may be computed between the facial tracks and similar facial tracks may be grouped together based on the similarity relationships. For example, each facial track may be analyzed to determine representative images within the track. The representative images may be chosen such that the range of facial expressions, orientations, and lighting conditions of the facial track are included in the representative images. In some instances, on average, 5 or more images may be selected per track. The representative images may allow for meaningful features to be computed, which may be used in comparing the representative images to other images.

Upon selecting the representative images for a facial track, the images may be compared to a representative image of other tracks to determine which tracks are similar (e.g., associated with the same entity). For example, facial properties (e.g., the location of eyes on the face, color of eye, shape of nose, etc.) for the faces in the various representative images may be compared, and if two representative images are similar enough (e.g., exceeding a predetermined similarity threshold, such as a distance between eyes on two faces being within a 5% margin of error), then the tracks having those representative images may be grouped together. This analysis can also consider positioning on an image. For example, if two faces appear in different locations in a given frame, the two tracks may be determined to be dissimilar (e.g., associated with different entities) on the assumption that the same character or entity will not appear in two locations of an image frame. Other properties of the representative images may also be compared to determine similarity of facial tracks, such as, for example, color histograms of the hair or upper body regions that are associated with the facial track.

At step 505, confidence values of the potential entities may be determined for each facial track. In some arrangements, a classifier or template matching may be used to determine the confidence values of a facial track. For example, ground truth data may be gathered for each potential entity in the content (e.g., by accessing a database including images for various actors, actresses, television and/or movie characters, and the like; or via a web search, such as Google Images, images for each entity may be gathered). In some variations, particular images may be manually added to the ground truth data. In some arrangements, the ground truth data for a particular entity may be used to train a classifier specific to that entity, and the classifier may be map various images of the facial track to determine a confidence value that the entity is the facial track. In others, the ground truth data may be used as templates for a template matching process, and the templates may be compared to various images of the facial track to determine a confidence value that the entity is the facial track.

The classification or template matching may be used repeatedly to determine a confidence value for each potential entity. In one particular example, where the potential entities are Ross, Phoebe, Joey and Monica, a vector of confidence values may be created that includes a confidence value for each potential entity, such as for example, a vector of <0.4, 0.2, 0.7, 0>, where 0.4 may be the probability that a given facial track is Ross, 0.2 may be the probability that the given facial track is Phoebe, 0.7 may be the probability that the given facial track is Joey, and 0 may be the probability that the given facial track is Monica.

Additionally, in some arrangements, a name of an entity may be associated with each facial track. For example, the name of the potential entity having the greatest confidence value may be assigned to the facial track by storing data defining the assignment in a data structure.

Figure 5B:
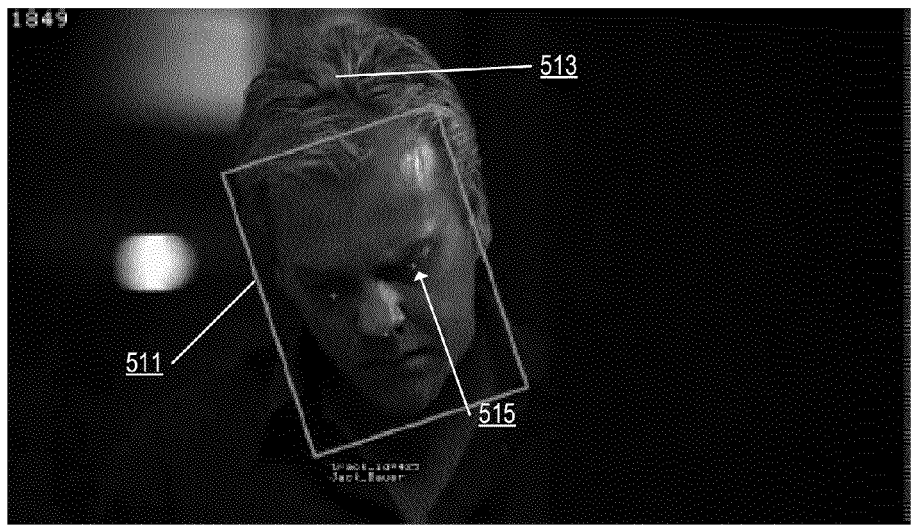
FIG. 5B illustrates an example graphical illustration of facial recognition according to one or more aspects described herein.
Figure 5B:
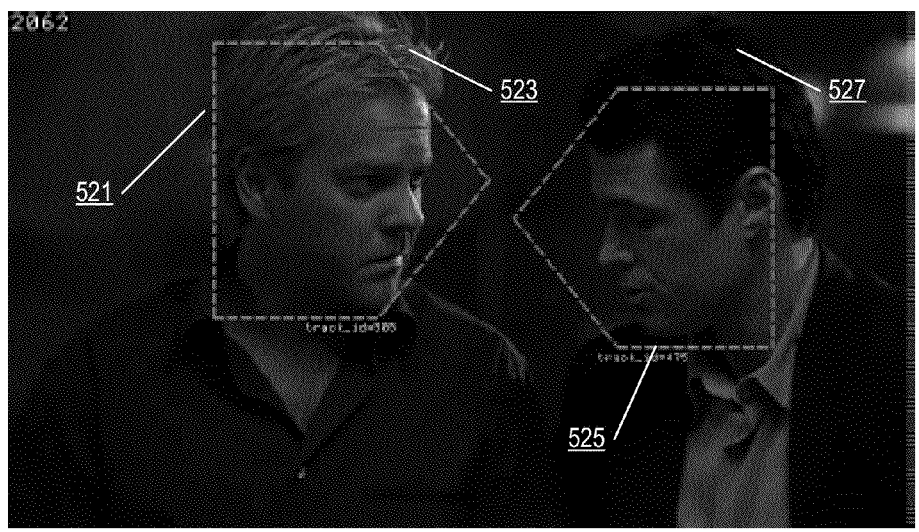

FIG. 5B illustrates an example graphical illustration of facial recognition. As illustrated in FIG. 5A, two example screenshots are shown. Screenshot 510 includes a bounding box 511 providing an indication of location of a face for entity 513, and indications of the entity's eyes and nose, such as eye indicator 515. Screenshot 520 includes two bounding boxes. Bounding box 521 provides an indication of the location and orientation of the face for entity 523, and bounding box 525 provides an indication of the location and orientation of the face for entity 527.

Figure 6:
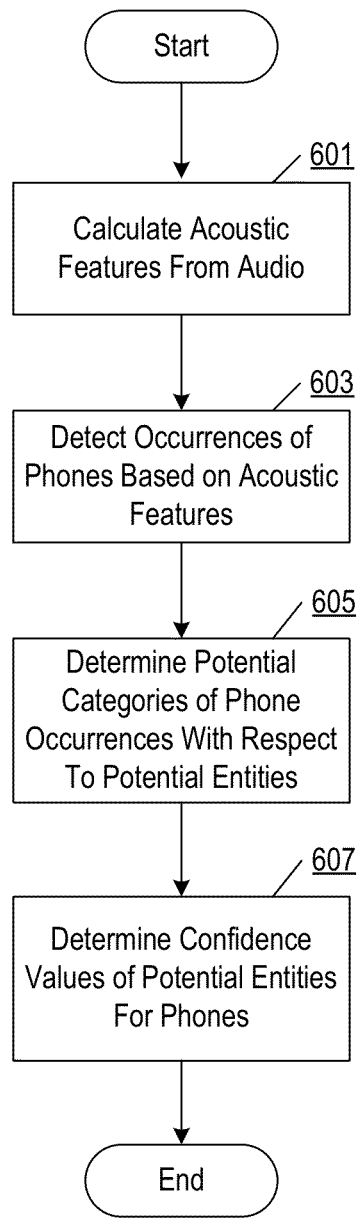
FIG. 6 illustrates an example method of voice recognition according to one or more aspects described herein.

FIG. 6 illustrates an example method of voice recognition. At step 601, acoustic features may be calculated from audio, such as an audio stream associated with the content. Various acoustic features may be calculated from the audio. For example, in some variations, an audio stream may be analyzed to derive mel-frequency cepstral coefficients (MFCCs).

At step 603, the occurrences of phones may be identified based on the acoustic features. In some embodiments, a speech recognition engine may be used to detect an occurrence of a phone. A phone may be a basic unit in phonetic speech analysis. A language may be comprised of various phones, and each phone may possess distinct physical or perceptual properties. In some arrangements, the speech recognition engine may be trained to detect which phone is being uttered. Additionally, in some arrangements, the speech recognition engine may not use a language model (e.g., a model specific to phones of the English language). Instead, the speech recognition engine may be trained only to detect the occurrence of a phone purely on acoustic features. By using a general purpose acoustic model instead of a language model, less training data may be used when training the speech recognition engine. Various speech recognition engines may be suitable for detecting an occurrence of a phone such as, for example, Hub4 of CMU Sphinx (an open source speech recognition toolkit developed by Carnegie Mellon University).

At step 605, one or more potential categories of each or selected phone occurrences may be determined with respect to the potential entities of the content. In some embodiments, the language of the audio is determined (e.g., preset by an operator, extracted from metadata accompanying the audio). The various phones for that language may have been divided into particular categories. For example, a phonetic alphabet describing the phones of the English language may define approximately 40 different phones. These 40 different phones may be assigned to a category based on, for example, the manner of articulation (e.g., how the phone is produced and the way in which the airstream is modified as it passes through the vocal tract), the place of articulation (e.g., the locations of the articulators involved in the production of the phone), the voicing of the articulation (e.g., whether vocal folds are vibrating during production of a particular phone), whether the phone is a dipthong (e.g., sounds, such as vowels, that may be consecutively pronounced), and whether the phone is monophthong (e.g., a single sound, such as a single vowel). Because various criteria may be used when assigning phones to a category, various different categorization schemes are possible.

One suitable categorization scheme may be as follows, which places each phone of a phonetic alphabet for English into one of six categories.

Front Articulation ("Front"): AA, AE, AH, EH, ER, EY, IH, IY, Y
Back Articulation ("Back"): AO, OW, UH, UW, W
Diphthong ("Diph"): AY, AW, OY
Stop Articulation ("Stop"): B, CH, D, G, JH, K, P, T
Continuous Articulation ("Cont"): DH, F, HH, L, R, S, SH, TH, V, Z, ZH
Nasal Articulation ("Nasal"): M, N, NG Upon determining the language, each or selected phone occurrences may be analyzed to calculate the probabilities that the phone belongs to a category of each potential entity. Recognition models may be used to determine the probabilities. In some variations, a set of recognition models may be defined for each potential entity, and each set of recognition models may include a model for each category. For example, if the content includes three potential entities (e.g., Ross, Monica and Joey) and the categorization scheme includes 6 categories (e.g., Front, Back, Diph, Stop, Cont, Nasal), the set of recognition models for Ross may include 6 gaussian mixture models (GMMs). Each of the GMMs may have been trained by ground truth data to produce a probability that a phone belongs to the GMM's designated category (e.g., one of the 6 GMMs for Ross is trained to recognize the "Front" category as it is pronounced by Ross (or the actor who plays Ross)).

For example, assume the "DH" phone is detected from an audio segment. This phone may be processed through the set of GMMs for Ross, the set of GMMS for Monica, and the set of GMMs for Joey. With respect to Ross, each GMM may calculate a confidence value that "DH" belongs to its category, such as 0.2 for the "Front" category or 0.5 for the "Back" category. Therefore, three vectors of confidence values may be produced, such as one vector that provides the confidence values for the categorization of the "DH" phone with respect to Ross (e.g., a vector with the confidence values that DH belongs to the "Back", "Front" "Diph", "Stop", "Cont", and "Nasal" categories as pronounced by Ross), a second vector that provides the confidence values for the categorization of the "DH" phone with respect to Monica, and a third vector that provides the confidence values for the categorization of the "DH" phone with respect to Joey.

At step 607, a confidence value for each or selected potential entities may be determined for each phone (or selected phones). In some embodiments, the confidence value for a potential entity may be selected from the confidence values resulting from the categorization for that entity. For example, continuing the above example where the "DH" phone is detected, the highest confidence value from the GMMs may be selected for that entity (e.g., if the 0.5 of the "Back" category is the greatest confidence value calculated by the set of GMMs for Ross, "Back" may be selected as the category for the DH phone with respect to Ross). Accordingly, DH may be categorized into a particular category with respect to Ross, Monica and Joey, and a vector of confidence values for the selected categories may be produced, such as, for example, a vector of <0.5, 0.2, 0.8>, where 0.5 may be the probability that the DH phone is a "Back" category pronounced by Ross, 0.2 may be the probability the DH phone is a "Front" category pronounced by Phoebe, 0.8 may be the probability that the DH phone is a "Cont" category pronounced by Joey.

As discussed above in connection with step 303 of FIG. 3, a computing device may perform scene segmentation on received content or otherwise group the shots into coherent scenes. FIG. 7 illustrates an example method of scene segmentation according to one or more aspects described herein. At step 701, shots in content may be identified. Various classifiers or processes may be used to identify the shots. For example, a classifier can be used that identifies a shot as a continuous sequence of video frames that was filmed by a single camera. A continuous sequence of frames may be defined by shot boundary frames that were created by video editing techniques which placed shots adjacent to each other in the video content (e.g., there exists a viewpoint discontinuity between adjacent frames that belong to different shots). Upon identifying the shots in the content, the computing device may create and/or store a data structure that provides details on the identified shots, such as, for example, the frame index number of the shot's last frame and the frame index number of the shot's last frame. Other information may be included in the shot data structure, such as time codes for the beginning frames and last frames, and the like. Data describing the features for the shots may also be included in the data structure (e.g., the feature information generated in connection with step 302 of FIG. 3). Additional data that might be stored may be color histograms and similar image descriptors.

Figure 8:
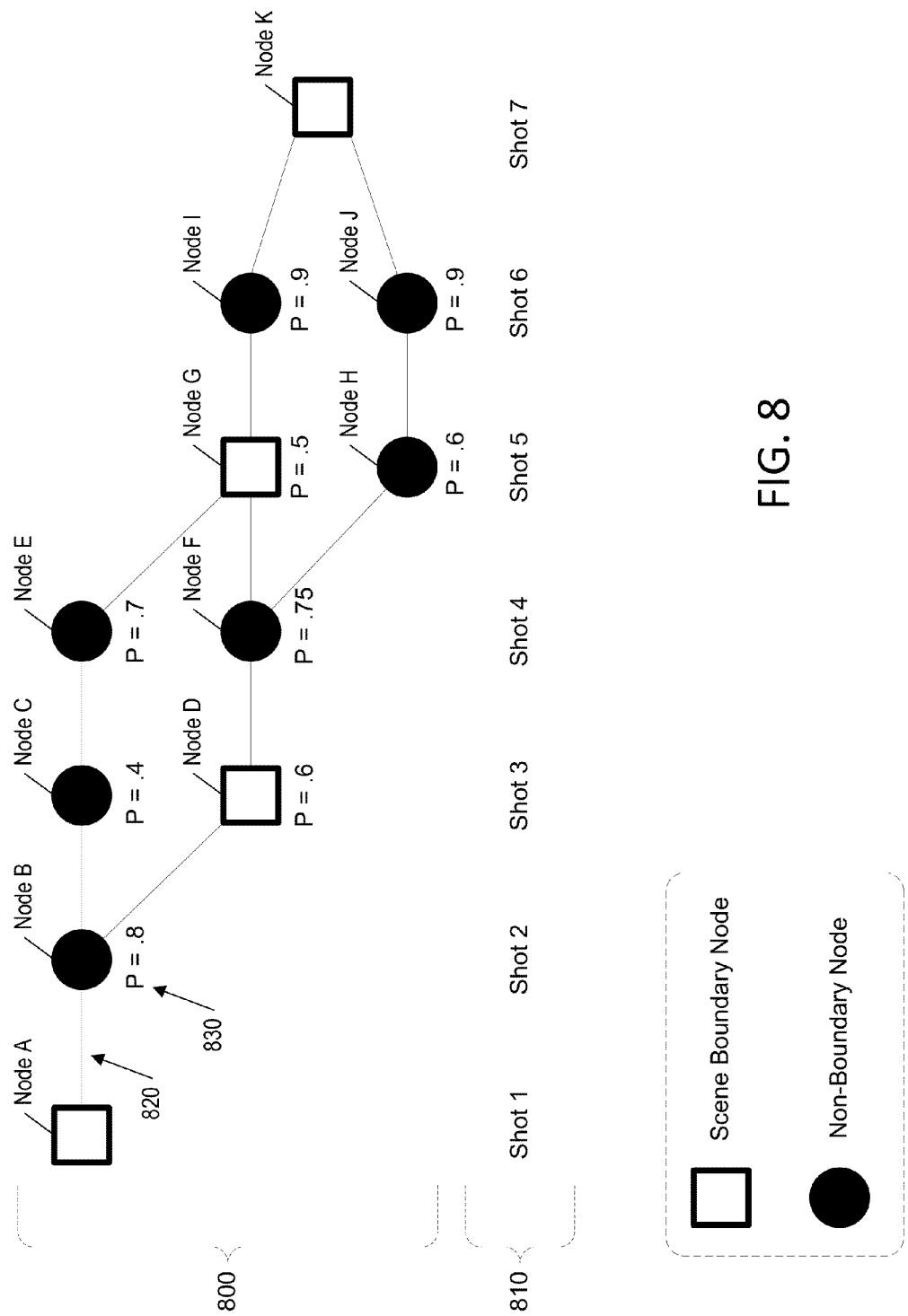
FIG. 8 illustrates an example graphical representation for a scene segmentation process according to one or more aspects described herein.

With all, or a desired number or collection of the shots identified, the computing device may proceed to group the shots into coherent scenes. As illustrated in FIG. 7 at steps 703-713, a shot may be analyzed and a decision or rule making engine, such as a decision lattice, may be created. For example, a decision lattice defines one or more paths through the lattice via scene boundary nodes, non-boundary nodes, and links between the nodes. An example graphical representation of a decision lattice is shown in FIG. 8. As illustrated in FIG. 8, the graphical representation includes various nodes 800 (e.g., nodes A-K) for corresponding sequential shots 810 (e.g., shots 1-7) in a piece of content (using video as the example); links between the nodes 800, such as link 820 between Node A and Node B; and probabilities for the various nodes, such as probability 830 for Node B. A path through the graphical representation may define how a series of shots can be strung together to define a scene (e.g., grouping of shots) for the content. As one example, one path through nodes 800 for the content may be from Node A to Node B to Node C to Node E to Node G to Node I and to Node K, and the scene represented by the path could contain the shots represented by those nodes and presented in the order of the path. In some arrangements, a shot belongs to only one scene and no two scenes may overlap. Further details of the example graphical representation of FIG. 8 will be described in connection with the steps of FIG. 7. A data structure may store information defining the decision lattice. For example, a data structure may store data defining the nodes, links, paths, shots, probabilities, time stamps or frame numbers for the shots, time stamps or frame numbers for the scene boundary nodes, etc.

At step 703 of FIG. 7, a computing device may, for the first shot of the content, insert a scene boundary node in the decision lattice. A scene boundary node can be any node in which a scene ends or begins (e.g., if Node A of FIG. 8 is a scene boundary node that ends a scene, the last frame of Shot 1 may be the final frame in the scene; if Node B of FIG. 8 is a scene boundary node that ends a scene, the first frame of Shot 3 may be the first frame in the scene). In some variations, because this is the first shot, the decision lattice may be initialized (e.g., creating an empty lattice) and a scene boundary node may be inserted into the lattice for the first shot (e.g., Node A may be inserted into the decision lattice represented by nodes 800 of FIG. 8). In some embodiments, the computing device may be configured to always insert a scene boundary node into the decision lattice for the first node.

Steps 705-711 represent an iterative process that analyzes shots of the content and inserts one or more nodes for an analyzed shot into the decision lattice. At step 705, a computing device may select the next shot in the content. At step 706, the computing device may determine whether the current shot is the last shot in the content. If the current shot is the last shot, the method may proceed to step 713. If the current shot is not the last shot, the method may proceed to step 707.

At step 707, a probability that the current shot is a scene boundary may be calculated. In some arrangements, a classifier may be used to calculate the probability that the current shot is a scene boundary. Various classifiers may be suitable for calculating the probability, such as a sliding-window classifier, logistic model tree, random forest, logistic regression and the like. A classifier may be configured to receive one or more feature vectors and calculate, or otherwise produce, the probability based on the one or more feature vectors.

Various types of features may be included in a feature vector, such as, for example, color information (e.g., background color information extracted from a frame or other color information representative of the shot), audio information (e.g., background noise information), and textual information (e.g., closed captioning data) of the current shot or previous shots may be used as features, and other types of simple features (e.g., features may not make reference to past decisions and that may be calculated once per shot) or recurrent features (e.g., features defined relative to other decisions earlier in the content). Other types of simple and recurrent features include whether a shot is considered to be a silent shot (e.g., no spoken dialogue); whether a shot includes a face or does not include a face; presence or absence of a detected hard shot boundary, such as a fade in or fade out; presence or absence of a detected camera technique, such as a camera zoom in or out; boundary property frequency; various features describing acoustic energy or power, such as, for example, the average level of noise throughout the shot or an amount of change in sound level throughout the shot; various features describing visual cohesion of shots, such as, a mean cosine similarity of two or more video frames whose visual features have been clustered to define a fixed number of visual words; an estimate of current scene length, such as, the current number of shots if the current shot would be a scene boundary or a non-boundary; a comparison between the entities of a preceding scene and the entities of the current shot; and various features describing the visual similarity of preceding scenes and the current shot. Additionally, any of the types of features recognized/determined at step 302 of FIG. 3 may be used by the classifier to calculate a probability.

One way to calculate the probability is through a Jaccard index comparison. A Jaccard index comparison may measure how similar various sets (e.g., 2 sets) are to each other. For example, if one set is composed of a feature vector for the current shot and the second set is composed of a feature vector for the previous shot, the ratio between the overlap of the two feature vectors and the union of the two feature vectors may be computed. Based on that ratio, the probability that the current shot is a scene boundary may be computed.

In one particular example, the classifier may receive two feature vectors, both of which may include features generated by a voice recognition process. The first feature vector may include a listing of entities that were identified in the current shot as speaking (e.g., a vector with Monica, Joey and Ross). The second feature vector may include a listing of entities that were identified in the previous shot as speaking (e.g., a vector Ross and Phoebe). The classifier may then determine the overlap of those two vectors (e.g., an overlap of Ross) and the union of the two vectors (e.g., a union of Monica, Joey, Ross and Phoebe). The ratio may be computed by dividing the number of items in the overlap by the number of items in the union. Accordingly, because the union includes one item (e.g., only Ross) and the union includes four items (e.g., Monica, Joey, Ross and Phoebe) the ratio may be determined as 0.25.

As another particular example, the first and second feature vectors may both identify Monica, Joey and Ross, as speaking in their respective shots. The overlap for these two features may be determined to be Monica, Joey and Ross. The union for these two features may be determined to be Monica, Joey and Ross. Accordingly, the ratio of the overlap and the union may be computed to be 1, because the overlap and union contain the same number of items.

In some arrangements, the ratio and the probability that the current shot is a scene boundary may form an indirect relationship. That is, the lower the ratio, the higher the probability that the current shot is a scene boundary, and the higher the ratio, the lower the probability that the current shot is a scene boundary. In some variations, the probability that the current shot is a scene boundary may be computed by subtracting the ratio from 1 (e.g., where the ratio is 0.25, the probability may be 0.75; where the ratio is 1, the probability may be 0).

In some variations, the classifier may calculate the probability using other methods in addition to or alternatively from the card index comparison, such as, for example, a harmonic mean.

Additionally, in some arrangements, the classifier may compute the probability based multiple shot window sizes (e.g., features for all shots within 3 shots before and after the current shot, features for all shots from the previous shot and 4 shots after the current shot, features for the previous shot and the current shot, etc.). For example, in some variations, for each or selected shot window sizes, the classifier may perform a card index comparison between the features of the current shot window. In one particular example, the classifier may be configured to calculate the probability based on three different window sizes: a window size of 1, 3 and 5. Thus, the classifier may perform a card index comparison on features for the current shot and the previous shot, may perform a card index comparison on features for the current shot and the three previous shots, and may perform a card index comparison on features for the current shot and the five previous shots. Upon performing the comparisons for each or selected window sizes, the probability that the current shot is a scene boundary may be calculated based on the comparisons (e.g., calculating the mean of the comparisons, calculating the median of the comparisons). In some arrangements, an outlier may be removed from the comparisons before calculating the probability.

At step 709, a probability that the current shot is a non-boundary node may be calculated. In some embodiments, a classifier similar to that used in step 707 may be used to calculate the probability that the current shot is a non-scene boundary. For example, a classifier for calculating the probability that the current shot is a non-boundary may be configured to receive two feature vectors. In one instance, the first feature vector may include a listing of entities whose faces were identified in the current shot via face recognition (e.g., a vector with Jack Bauer). The second feature vector may include a listing of entities whose faces were identified in the previous shot via face recognition (e.g., a vector with Jack Bauer and another identified character). The classifier may then determine the overlap of those two vectors (e.g., an overlap of Jack Bauer) and the union of the two vectors (e.g., a union of Jack Bauer and the other identified character). The ratio may be computed by dividing the number of items in the overlap by the number of items in the union. Accordingly, because the union includes one item (e.g., only Jack Bauer) and the union includes two items the ratio may be determined as 0.5.

In some arrangements, the ratio and the probability that the current shot is a non-boundary may form a direct relationship. That is, the lower the ratio, the lower the probability that the current shot is a non-boundary, and the higher the ratio, the higher the probability that the current shot is a non-boundary. In some variations, the probability that the current shot is a non-boundary may be equal to the ratio.

In some arrangements, step 707 and 709 may be combined into a single step (e.g., produced by a single classifier). In others, step 709 may precede step 707.

At step 711, one of the nodes for the current shot may be inserted into the decision lattice based on the calculated probabilities. Insertion of a node into a decision lattice may include, for example, inserting a scene boundary node or a non-boundary node into the decision lattice for the current shot, setting the probability of the node, and defining links to one or more nodes previously inserted into the decision lattice. Additionally, in some arrangements, previously inserted nodes may be modified to define links to the newly inserted node. In some embodiments, probabilities may also be defined for the links between the nodes (e.g., instead of defining probabilities for the node, the probabilities are defined only for the links between the nodes) and used in various calculations described herein. In some variations, the determination of what types of nodes to insert into the decision lattice may be based on a threshold comparison, such as the following.

$$|P_n - P_b| < T$$

In the above example, $P_n$ is the probability that the current shot is a non-boundary, $P_b$ is the probability that the current shot is a scene boundary, and T is a threshold value. If the absolute value of the difference between $P_n$ and $P_b$ fails the above condition (that is, the absolute value of the difference is greater than or equal to the threshold, T), a node corresponding to the greatest probability may be inserted into the decision lattice. For example, assume that T is equal to 0.4, that $P_n$ is equal to 0.8, and $P_b$ is equal to 0.1. For this example, because the difference between $P_n$ and $P_b$, which is equal to 0.7, is greater than T, a non-boundary may be inserted into the decision lattice for the current shot (e.g., Node B for shot 2, as illustrated in FIG. 8). Similarly, if T is equal to 0.4, $P_n$ is equal to 0.1, and $P_b$ is equal to 0.8, a scene boundary node may be inserted into the decision lattice for the current shot. The probability of a node may be set to $P_n$ for non-boundary nodes, and may be set to $P_b$ for boundary nodes.

However, if the absolute value of the difference between $P_n$ and $P_b$ satisfies the above condition (that is, the absolute value of the difference is less than the threshold, T), a scene boundary node and a non-boundary node may be inserted into the decision lattice for the current shot. In one example where T is equal to 0.3, Node C and Node D may be inserted into a decision lattice for shot 3, as illustrated in FIG. 8, because $P_n$ equals 0.4 (shown below Node C in FIG. 8) and $P_b$ equals 0.6 (shown below Node D in FIG. 8). Similarly, Node G and H may be inserted into the decision lattice for shot 5, as illustrated in FIG. 8, because $P_n$ and $P_b$ both equal 0.5.

Further, in some embodiments, when a non-boundary node and a boundary node are inserted into the decision lattice for the current shot, the insertion of the two nodes may introduce a new path into the decision lattice. Paths may be defined by the nodes of the decision lattice and the logical links that are defined between nodes of adjacent shots. For example, as illustrated by nodes 800 of FIG. 8, one path exists between Node A and Node B; however, two paths exist between Node B and Node G. A first path between Node B and Node G may be the path defined by traversing from Node B to Node C to Node E and to Node G. A second path between Node B and Node G may be the path defined by traversing from Node B to Node D to Node F and to Node G.

In some arrangements, when multiple paths exist within the lattice due to the insertion of additional nodes for previous shots as discussed above, even more additional nodes may be inserted into the decision lattice for future shots. More particularly, in one or more arrangements, if multiple paths have been created due to previous shots leading up to a current shot, then the current shot can have multiple nodes added to the lattice, each of the multiple nodes corresponding to one of the multiple paths. For example, as illustrated by nodes 800 of FIG. 8, shot 3 introduced a new path into the decision lattice (e.g., a path including Node C and a second path including Node D). For shot 4, assume it was determined to insert a non-boundary node into the decision lattice. Accordingly, a non-boundary node may be inserted into the decision lattice for the two paths (e.g., Node E and Node F may be inserted into the decision lattice).

Additionally, in some embodiments, when multiple paths exist within the lattice, all paths may converge onto a scene boundary node when a scene boundary node is inserted into the decision lattice. In some variations, decisions in the lattice may be considered conditionally independent of earlier decisions preceding the closed prior scene boundary node. Therefore, paths may converge on a scene boundary node. For example, as illustrated by nodes 800 of FIG. 8, a scene boundary node, Node G, was inserted into the decision lattice for shot 5. The closest prior scene boundary node is Node D for Shot 3. The path including Node E originates prior to Node D.

Accordingly, the path including Node E may converge to Node G and the path including Node F may converge to Node G.

In some instances, other paths not converge on a scene boundary node. For example, if, instead of inserting only non-boundary Node E for its path, the path had split with insertion of a non-boundary node and a scene boundary node (not shown), the resulting split paths may not converge on Node G instead of inserting only non-boundary Node E for its path. As another example, as illustrated by nodes 800 of FIG. 8, Node H was inserted into the decision lattice for shot 5 in addition to Node G, which introduced a new path (e.g., a path that includes Node F and Node H). In some arrangements, a non-boundary node may be linked to only the node of the previous shot with the highest probability (e.g., Node H is linked to Node F, as illustrated in nodes 800 of FIG. 8).

In other variations, insertion of a scene boundary node for a given shot into the decision lattice when multiple paths exist may prevent new paths from being inserted into the decision lattice for that shot, thereby terminating all paths that included prior shots. Using the FIG. 8 example, under such a system Node H would not have been inserted, and both paths would terminate at Node G.

Additionally, in some variations, a scene may be required to have a minimum length. For example, in one or more arrangements that require a minimum length, scene boundary nodes may be inserted into the decision lattice only if the number of shots between the shot corresponding to the previous scene boundary node (e.g., shot 3) and the current shot (e.g., shot 5) is greater than (or equal to) the minimum number of shots required for a scene (e.g., node G, as illustrated by nodes 800 of FIG. 8, may be inserted if the minimum number is two, but would not be inserted if the minimum number is three). Counting frame time stamps, instead of shots, can be an alternative approach to requiring this minimum.

Alternatively, the minimum length for a scene may affect the probabilities for the current shots. For example, if the one of the nodes in the decision lattice prior to the current shot and within the required minimum length is a scene boundary node, the probability that the current shot is a non-boundary may be increased (e.g., the probability for Node F, as illustrated in nodes 800 of FIG. 8, may increase 0.05 to 0.75, because Node D is a scene boundary). Further, in some variations, only nodes within the current path of the current shot may affect the probabilities for the current shots (e.g., as illustrated by nodes 800 of FIG. 8, if shot 4 is the current shot and the path including Node F is the current path, Node C may be ignored, while Node D may affect the probability that shot 4 is a non-boundary).

Upon inserting the appropriate nodes into the decision lattice for the current shot, the method may proceed to step 705 to continue the iterative process of analyzing shots of the content.

At step 713, the last shot in the content may have been reached. For the last shot, a scene boundary node may be inserted into the decision lattice (e.g., Node K may be inserted into the decision lattice represented by nodes 800 of FIG. 8). In some embodiments, the computing device may be configured to always insert a scene boundary node into the decision lattice for the last shot. Further, in some embodiments, insertion of the node for the last shot may cause any path of the previous shot to converge into the node for the last shot (e.g., with respect to nodes 800 of FIG. 8, the path that includes Node I converges to Node K, and the path that includes Node J converges to Node K).

At step 715, the paths through the decision lattice may be ranked. The ranking of paths may be performed in various ways. For example, the probabilities of the nodes in a particular path may processed through some suitable calculation that numerically ranks the paths through the decision lattice (e.g., multiplied, summed, averaged, etc.). In one particular example, the log of each or selected probabilities along a path may be calculated (e.g., using the probabilities of the nodes and/or links), and the resulting values may be summed to produce a confidence value for the path. The paths may be ranked in accordance with the confidence values for the paths. In some arrangements, the probability for the first node of the decision lattice and the last node of the decision lattice may be defined as 1. In other arrangements, the first node and last node are ignored in the calculation.

With respect to nodes 800 of FIG. 8, three example paths may be ranked. The first path (e.g., Path A) may be the path from Node A to Node B to Node C to Node E to Node G to Node I and ending at Node K. The second path (e.g., Path B) may be the path from Node A to Node B to Node D to Node F to Node G to Node I and ending at Node K. The third path (e.g., Path C) may be the path from Node A to Node B to Node D to Node F to Node H to Node J and ending at Node K. The confidence value for Path A may be calculated as follows:

$$\log(1)+\log(0.8)+\log(0.4)+\log(0.7)+\log(0.5)+\log(0.9)+\log(1)=-0.997$$

The confidence value for Path B may be calculated as follows:

$$\log(1)+\log(0.8)+\log(0.6)+\log(0.75)+\log(0.5)+\log(0.9)+\log(1)=-0.790$$

The confidence value for Path C may be calculated as follows:

$$\log(1)+\log(0.8)+\log(0.6)+\log(0.75)+\log(0.6)+\log(0.9)+\log(1)=-0.711$$

Upon calculating the confidence values, the ranking may be determined. For example, in some variations, the ranking may be ordered so that the greatest confidence value is ranked first and the lowest confidence value is ranked last. Accordingly, with respect to the above example, Path C may be ranked first, Path B may be ranked second and the Path A may be ranked third.

Further, some variations may use other criteria when determining the ranking. For example, the number of scenes and/or the length of the scenes along a path may be used when ranking the paths (e.g., average length of the scenes, median length, mode length, etc.). Length of a scene may be defined by the difference in shots between two scene boundary nodes along a path (e.g., the first path includes a scene of length 4 from shot 1 to shot 5). The ranking may be based on the number or length of the scene in various ways such as, for example, comparing the number or lengths to an expected number or length and placing paths with scenes that are closer (e.g., in number or size) to the expected number or length higher in the ranking. Other ways to base the ranking on the number or length of scenes includes ranking the paths in accordance with the greatest or least number of scenes (e.g., path with the most scenes is at the top or the bottom of the ranking), in accordance with the largest or smallest length of scene (e.g., path with the longest scene is at the top or the bottom of the ranking), and the like.

The ranking of the paths may also be based on the distribution of the scene lengths. For example, a classifier may be trained to determine a distribution of expected scene lengths (e.g., process a corpus of training data to fit a Gaussian or Poisson distribution). The distribution of scene lengths for a path may be determined and then compared to the distribution of expected scene lengths. For example, the Hellinger distance, which is a measure of similarity between probability distributions, may be computed. In particular, the Hellinger distance between the path's distribution of scene lengths and the classifier's distribution of expected scene lengths may be computed as H(path). The confidence value for a path based on the Hellinger distance may be defined as 1−H(path).

Additionally, the other criteria may be used in conjunction with the above-discussed numerical ranking methods. For example, the ranking may first be determined using a numerical method (e.g., by confidence value of the paths) and if the confidence values of two or more paths are within a threshold of each other (e.g., if the confidence values of two or more paths are the same), the two or more paths may be re-ordered based on other criteria (e.g., resolving the tie between paths having the same confidence value by re-ordering based on scene length). As one particular example, assume the threshold is 0.09. Because the confidence values for Path B and Path C are within the threshold, their order in the ranking may be further based on an expected scene length. Assume that Path C includes 1 scene that is within a tolerance of the expected scene length and Path B includes 3 scenes that are within the tolerance of the expected scene length. Therefore, Path B may be placed higher in the ranking than Path C, because Path B includes a greater number of scenes similar to the expected scene length.

As another example, the Hellinger distance and the probability of the decision lattice's nodes may both be used to determine a set of confidence values for ranking the paths. Such a confidence value, W, may be calculated for a path by the following formula:

$$W = \alpha\left(\sum_{Path} \log(P)\right) + \beta\log(1 - H(\text{path}))\eta$$

Where α and β are selected parameters that provide a weight to their respective portion of the above equation;

$$\sum_{Path} \log(P)$$

represents the sum of the log of each or selected probabilities along the path; log(1−H(path)) represents the log of 1 minus the Hellinger distance of the path; and η is the number of probabilities along the path. α and β may be selected based on design choice, such as by selecting values so that the probabilities of the lattice's path may be given more, less or equal weight than the Hellinger distance calculation. For example, to give the probabilities along the lattice's path more weight, α may be set to a value greater than β (e.g., α may be set to 0.7 and β may be set to 0.3). To give the probabilities along the lattice's path less weight, α may be set to a value less than β (e.g., α may be set to 0.4 and β may be set to 0.7). To give the probabilities along the lattice's path equal weight, α and β may both be set to the same value (e.g., 0.5). Upon calculating W for each or selected paths, the ranking of the paths may be ordered in accordance with the confidence values (e.g., the paths are ordered by W from greatest W to lowest W).

At step 717, one of the paths may be selected as the scene segmentation for the content. In some arrangements, the selected path may be the path that is at the top of the ranking that was determined in step 715. For example, if the ranking of Path A, Path B and Path C was determined to be Path C, followed by Path B and Path A, the computing device may select Path C as the scene segmentation for the content.

The nodes of the selected path may define the scene segmentation for the content. For example, Path C represents one of the paths through the nodes 800 of FIG. 8. Specifically, it represents the path from Node A to Node B to Node D to Node F to Node H to Node J and ending at Node K. The scene boundary nodes along the path may indicate the beginning of a new scene. Therefore, Path C may include a first scene from shot 1 to shot 2, and a second scene from shot 3 to shot 7. Additionally, in some embodiments, the scene boundary nodes along the path may indicate the end of the current scene. Therefore, Path C may include a first scene from shot 1 to shot 3, and a second scene from shot 3 to shot 7. In some variations, the first scene boundary node of the path (e.g., Node A) is included as part of the first scene. Further, in some arrangements, the last scene boundary node of the path (e.g., Node K) is included as part of the final scene.

In some arrangements, upon selecting the path for use as the scene segmentation, data describing the scene segmentation may be stored or otherwise organized for later retrieval. For example, a data structure may be created that identifies the scenes in the content (e.g., the beginning and ending of a scene, such as by shot, frame index or time code), and includes or otherwise links to feature information for a scene. Feature information may be gathered, for example, by collecting or identifying all the feature information for each or selected shots in the scene, and placing the collected feature information into the data structure or otherwise placing an identification of where the collected feature information can be found. In some variations, the feature information included or referenced by the data structure includes only particular types of feature information, such as the feature information generated by FIG. 4 (e.g., vectors of confidence values generated by a face recognition process, vectors of confidence values generated by a voice recognition process, an identification of the potential entities in the content, etc.).

Figure 9:
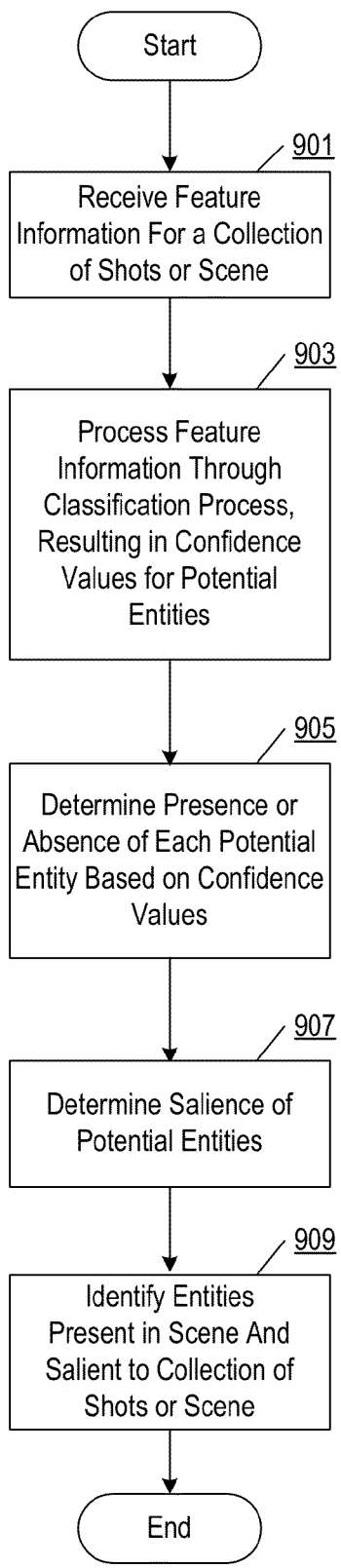
FIG. 9 illustrates an example method of identifying presence and/or non-presence of items in a collection of shots, such as a scene, according to various aspects described herein.
Figure 10:
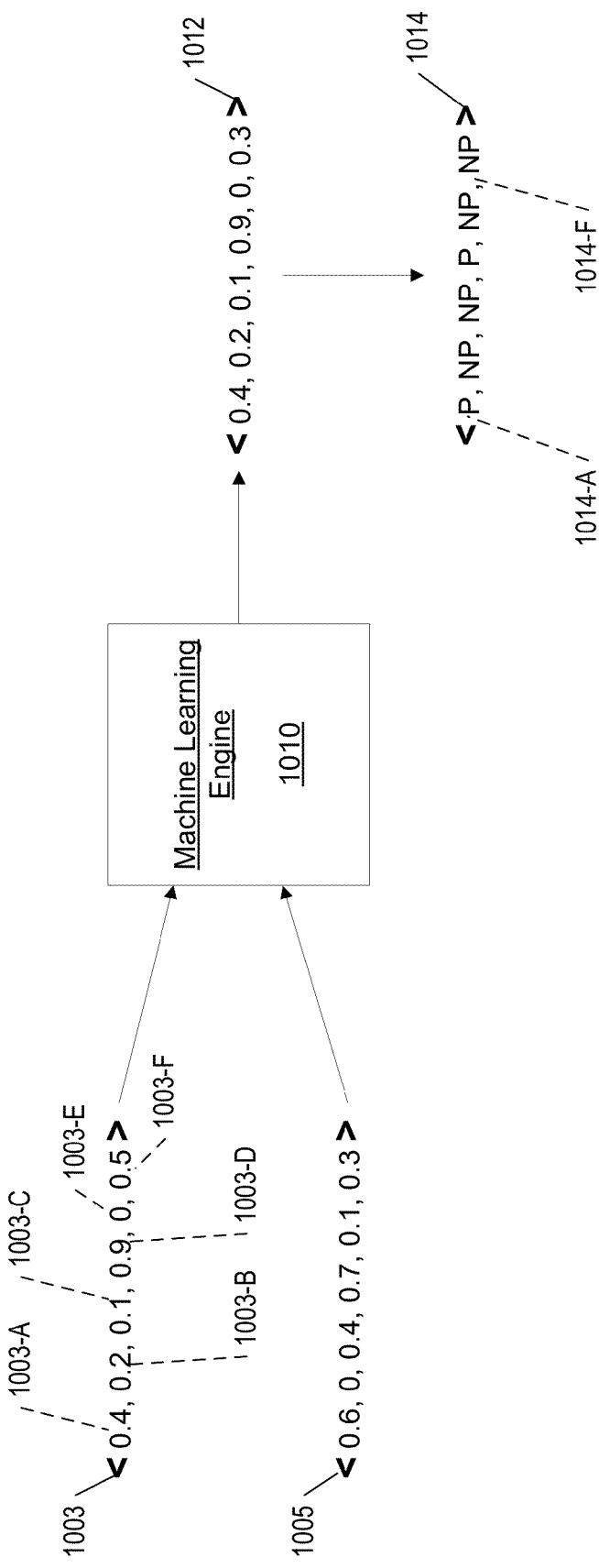
FIG. 10 illustrates an example of determining presence and/or non-presence of entities in a collection of shots, such as a scene, according to various aspects described herein.

As discussed above in connection with step 304 of FIG. 3, a computing device may identify which entities are present or not present in a scene based on feature information. FIG. 9 illustrates an example method of identifying presence and/or non-presence of items or entities in a collection of shots, such as a scene. In some embodiments, the example method of FIG. 9 may be repeated for each or selected shot collections in the content, such as one or more scenes defined by the scene segmentation of FIG. 7. FIG. 10 illustrates an example of determining where presence and/or non-presence of entities in a collection of shots, such as a scene. Details of the example illustrated by FIG. 10 will be described in connection with the steps of FIG. 9. For simplicity, FIG. 9 and FIG. 10 will be described with respect to a scene; however, various other collections of shots could be used. A collection of shots can include one or more shots.

At step 901, feature information for a scene may be received or otherwise identified. In one or more embodiments, feature information may be received or identified by accessing one or more data structures. For example, a data structure, such as metadata, that defines properties of the shots in a scene may be accessed to identify the feature information for the scene. In some arrangements, a software module may provide the feature information for the scene or a reference to the feature information for the scene. In general, any suitable source of feature information may be used. For example, the feature information may include data generated via face recognition, voice recognition, textual recognition, or the like. Additionally, the types of features may be selected based on availability within the scene (e.g., if a face was detected, facial recognition information may be included as part of the feature information).

At step 903, the feature information may be processed through a classification process, which results in a confidence value for each or selected potential entities in the scene. In some arrangements, feature information from two or more feature sources may be used as input to the classification process. For example, with respect to the example illustrated in FIG. 10, input from two sources is shown. Vector 1003 may have been created from a face recognition process and vector 1005 may have been created by a voice recognition process. A vector may include a confidence value for each or selected potential entities that is in the content, and a confidence value may indicate presence or absence of the entity for that portion of the content (e.g., presence in the scene, presence in the shot of the scene, etc). As illustrated, vector 1003 includes confidence value 1003-A that the first entity (e.g. a cast member or character) is present, confidence value 1003-B that the second entity is present, confidence value 1003-C that the third entity is present, confidence value 1003-D that the fourth entity is present, confidence value 1003-E that the fifth entity is present, and confidence value 1003-F that the sixth entity is present. Vector 1005 includes similar confidence values for the six entities.

The inputs from the sources of feature information may be processed through a machine learning engine that is comprised of one or more classifiers, such as rotational forests and/or logistic model trees and the like. In some variations, the machine learning engine may be trained to map the input vectors into a single vector of confidence values. As illustrated in the example of FIG. 10, machine learning engine 1010 receives vectors 1003 and 1005 and produces vector 1012, which includes a confidence value for one or more potential entities in the scene.

At step 905, presence or absence of each or selected potential entities may be determined based on the confidence values. In some arrangements, the presence or non-presence of a potential entity may be determined based on one or more thresholds (e.g., a minimum threshold for all values, or a minimum threshold specific to a potential entity). If a confidence value is greater than the threshold, the potential entity is determined to be present in the scene. Otherwise, the potential entity is absent from the scene (e.g., not present). In some variations, the determination may result in a vector of presence identifiers, and the vector of presence identifiers includes an identifier for a potential entity in the content. A presence identifier may indicate presence (e.g., "P") or absence (e.g., "NP"). As illustrated in FIG. 10, vector 1014 includes a presence identifier for each or selected potential entities in the scene.

Additionally, in some embodiments, steps 903 and 905 may be combined into a single step. For example, the machine learning engine may map the received feature information to a single vector of presence indicators such that such that the classification is maximized for the one or more potential entities included in the vector. With reference to FIG. 10, vector 1014 may be produced by machine learning engine 1010 instead of vector 1012. A presence identifier of vector 1014 may be selected so that the classification for its corresponding entity is maximized (e.g., presence indicator 1014-A may be selected as "P" because a classification of presence is maximal for the first entity; presence indicator 1014-E may be selected as "NP" because a classification of absence is maximal for the sixth entity).

In some arrangements, further steps may be performed to filter one or more entities from those determined to be present in step 905. For example, as illustrated in step 907, salience of a potential entity in the scene may be determined. The value of a salience measurement may numerically indicate how important or salient a particular entity is to the scene. Accordingly, in some embodiments, a salience measurement for a potential entity in the content may be calculated for the scene.

In one or more arrangements, a function for calculating a salience measurement may be the sum of time that the potential entity is present in the scene normalized by the length of the scene. The time that the potential entity is present in the scene may be calculated by determining the union of face recognition data and voice recognition data indicating the entity is present, and calculating the total duration of the union. In some instances, determining the union may include merging overlapping intervals of face recognition data and voice recognition data. Additionally, the recognition data may be selected based on the confidence that the potential entity is present. For example, the face recognition data may be the face track that has the highest confidence out of all possible face tracks for that potential entity.

At step 909, one or more entities that are present in the scene and salient to the scene may be identified. In some variations, the salience measurements may be compared to a threshold value and any potential entity whose salience measurement is less than the threshold may be filtered from the entities present in the scene (or otherwise set as absent from the scene). For example, with respect to the example illustrated in FIG. 10, presence identifier 1014-A for the first entity is "P" or present. If the salience measurement for the first entity is less than the threshold, presence identifier 1014-A may be set to "NP" or absent from the scene. Accordingly, in some instances, the resulting vector of presence identifiers may indicate which entities are present (e.g., "P") if the entities are both present in the scene and salient to the scene.

Upon determining the vector of presence identifiers, data identifying the entities present in the scene may be stored in a data structure (e.g., a data structure that includes data describing the content, data describing the scenes of the content, data describing which entities are present in a scene). For example, with respect to the example of FIG. 10, vector of presence identifiers 1014 indicates that the first entity and the fourth entity is present. Therefore, the names of the first and fourth entity (e.g., "Ross" and "Phoebe") may be identified, and may be stored in the data structure as a list that provides names of the entities present in the scene. This data may be used for various applications. For example, among other uses, data describing which entities are present in a scene of content may supplement metadata for the content and may be viewed by the user. Other data that may be stored includes the length of the entity's presence in the scene, the minimum, maximum or average size of the detected faces, the amount of time in which an entity spoke, and a transcript of what an entity spoke, etc.

In some variations, instead of performing the method of FIG. 9 with respect to scenes of the content (e.g., performed per scene), the example method of FIG. 9 may be performed with respect to any interval of content (e.g., performed per frame, shot, or for a particular time interval of the content). For example, a method similar to FIG. 9 may be performed with respect shots of the content to generate a single vector of confidence values for a shot (e.g., a single vector for a shot similar to vector 1014 of FIG. 10). Feature information for a shot may be gathered from different sources of feature information (e.g., face and voice recognition data) and used to generate a single vector. The resulting vectors may be stored and, also, may be used as a source of feature information for later iterations. For example, vectors resulting from the method being performed on a per frame basis may be used as a source of feature information for a later iteration of the method being performed for a different interval, such as on a per scene basis.

Figure 11A:
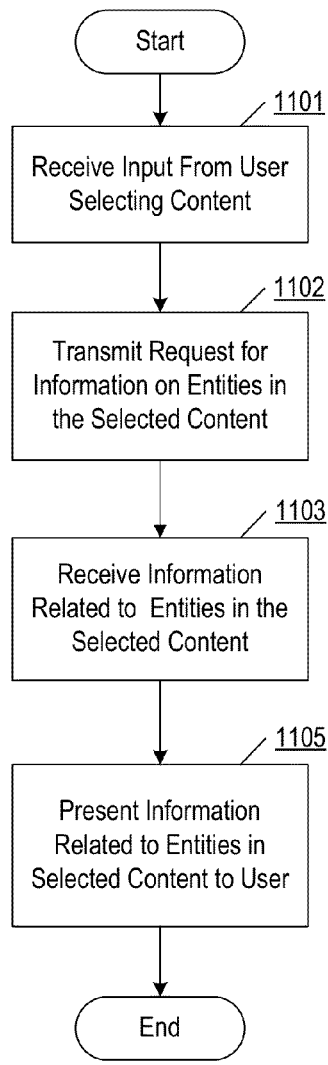
FIG. 11A illustrates an example method for presenting information related to one or more items present in a collection of shots, such as a scene, according to one or more aspects described herein.

FIG. 11A illustrates an example method for presenting information related to one or more items present in a collection of shots, such as a scene. In particular, FIG. 11A illustrates an example method that may be performed at a client device, such as a display device or a set top box, digital video recorder, personal computer, mobile device, or other computing device that is in communication with a display device. At step 1101, input may be received from a user that represents a selection of content, e.g., current audio-visual content. For example, a user may be watching a live program (e.g., a sitcom) or a program from a recording device (e.g., an episode of a weekly drama from a DVR), and may be interested in learning additional information about one of the characters or actors appearing in the program. In some variations, a user may use a remote (e.g., via one or more buttons) or touchscreen to select a particular portion of the current program. Metadata that identifies the entities in the program may accompany the program and a selectable identifier for an entity present in shot, shot collection, or scene may be displayed. A user may press a button on the remote or touchscreen to enter a mode where the identifiers are displayed and may be selected via additional user interactions (e.g., select the identifier for "Ross"). In some embodiments, the identifiers may be placed, for example, along the bottom of the display screen as a list. Additionally, the identifiers may be displayed in relation to the current location of the entities. For example, if Ross and Monica are present in the current shot, collection of shots, or scene, a button for Ross may be placed at or near an estimated location of Ross, and a button for Monica may be placed at or near an estimated location of Monica. In some arrangements, the estimated locations may be included in the metadata accompanying the program. A user may be able to traverse these buttons and select one or more of them in order to request additional information about the characters Ross or Monica, or the actors portraying them.

As another example, a user may press a button on the remote or touchscreen to pause the program. While paused, the user may select a particular portion of the displayed image to use as the selected content, such as a portion of the image that includes the actor or character the user wishes to learn additional information about. In other variations, a user may press a button that causes a frame of the program to be captured as used as the selected content (e.g., the currently displayed video frame).

At step 1102, a request for information related to one or more entities in the selected content may be transmitted. For example, the request may be transmitted to a server of the content provider that is configured to receive and respond to such requests. In some variations, the request may include an identifier of an entity (e.g., a name of the selected entity), an image that includes one or more entities, and/or a portion of an image that includes one or more entities.

At step 1103, information related to the one or more entities in the selected content may be received. This information may include various different types of information related to the entities. For example, if the user requested information related to the entity Ross (or the actor portraying Ross), the information may include other shots, collection of shots or scenes where Ross or the actor portraying Ross is present (e.g., a shot or scene from the same content and/or other content that has been segmented using a method such as FIG. 7, where Ross is determined to be present using a method such as FIG. 9). The information may also include a textual biography of the actor portraying Ross, or links to other content where Ross is present (e.g., a link to a website where a movie may be purchased or ordered, or a link to an on-demand application of the content provider where a movie may be accessed).

At step 1105, the information related to the one or more entities may be presented to the user. For example, in some arrangements, the information may be presented in one or more pop-up display areas (e.g., a pop-up widget anchored to an estimated location of the entity may be displayed). In some variations, the information may be presented in a specific area of the display screen (e.g., along the bottom third of the display screen). As another example, the information may be presented in a separate display screen. For example, a display screen similar to a web browser may be displayed that provides the information in a manner similar to results of a search engine. A user may be able to select and view any of the returned content segments or view other information that is presented. Additionally, in some variations, a user may be able to provide feedback to the system such as, for example, whether the presented information was for the correct entity.

Figure 11B:
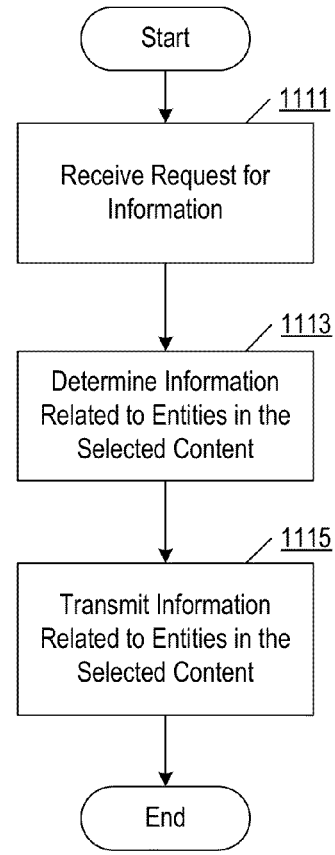
FIG. 11B illustrates an example method for transmitting information related to one or more items present in a collection of shots, such as a scene, according to one or more aspects described herein.

FIG. 11B illustrates an example method for transmitting information related to one or more items present in a collection of shots, such as a scene. In particular, FIG. 11B illustrates an example method that may be performed at a server, such as a server of a content provider that is configured to receive requests from a client request and respond to the requests. At step 1111, a request for information may be received from a client device. The request may include selected content. In some arrangements, the selected content may be provided by one or more identifiers of an entity, an image that includes one or more entities, and/or a portion of an image that includes one or more entities.

At step 1113, information related to one or more entities in the selected content may be determined. In some embodiments, searches may be performed of one or more data repositories for data related to the entities. For example, a search may be performed that queries for shots, collection of shots, or scenes of other content where the entity is present. Searches may also be performed that query for a textual description of the entity (e.g., a biography of the actor). Any information received responsive to the searches may be included as part of the information related to the one or more entities, such as, for example additional content where the entity is present, links to content where the entity is present, links to websites or other locations where content may be viewed, and the like. At step 1115, the information related to the one or more entities may be transmitted to the client device.

Additionally, in some instances, the content provider may have blocked particular entities from being searched or included as metadata. In such instances, any metadata accompanying content or information related to the one or more entities may be searched for the blocked entities and data describing the blocked entities may be removed.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method, comprising:
    identifying a set of entities in video content;
    for a scene in the video content, identifying a first confidence value vector that is representative of features of the scene and that is a result of a video recognition process;
    for the scene, identifying a second confidence value vector that is representative of features of the scene and that is a result of an audio recognition process; and
    based on the first confidence value vector and the second confidence value vector, determining, by a computing device, at least one identifier that defines whether an entity in the set of entities is present in the scene.

2. The method of claim 1, further comprising:
    identifying a plurality of shots in the video content;
    creating a lattice of nodes that comprises at least one of a scene boundary node or a non-scene boundary node for each shot in the plurality of shots, wherein the lattice of nodes defines a plurality of paths beginning at a first shot of the plurality of shots and ending at a last shot of the plurality of shots;
    ranking the plurality of paths; and
    selecting, based on the ranking, which one of the plurality of paths is to define where boundaries of the scene are located in the video content.

3. The method of claim 2, wherein creating the lattice of nodes comprises:
    calculating a probability that a current shot is a scene boundary;
    calculating a probability that the current shot is a non-scene boundary; and
    inserting the at least one of the scene boundary node or the non-scene boundary node for the current shot into the lattice based on the probability that the current shot is a scene boundary and the probability that the current shot is a non-scene boundary.

4. The method of claim 1, wherein the video recognition process comprises a face recognition process, wherein the audio recognition process comprises a voice recognition process, wherein at least one confidence value of the first confidence value vector defines a probability that a face of an entity in the set of entities is present, and wherein at least one confidence value of the second confidence value vector defines a probability that a category of phone is being uttered by an entity in the set of entities.

5. The method of claim 1, further comprising:
    calculating acoustic features from audio of the video content;
    detecting an occurrence of a phone based on the acoustic features;
    determining a plurality of confidence values for each entity in the set of entities, wherein at least one value in the plurality of confidence values defines a probability that the phone belongs to one of a plurality of phone categories; and
    determining the second confidence value vector from the plurality of confidence values for each entity in the set of entities, wherein a first value of the second confidence value vector is selected from a first plurality of confidence values for a first entity in the set of entities.

6. The method of claim 5, wherein determining the plurality of confidence values for each entity in the set of entities comprises calculating the first plurality of confidence values for the first entity using a set of mixture models, wherein each model in the set of mixture models calculates a probability that an input phone belongs to a phone category pronounced by the first entity, and wherein each model in the set of mixture models corresponds to one of the plurality of phone categories.

7. The method of claim 1, further comprising:
for the scene, determining a plurality of salience measurements, wherein each of the plurality of salience measurements corresponds to a different entity in the set of entities, and a first measurement in the plurality of salience measurements numerically indicates importance of a first entity to the scene;
determining that the first measurement satisfies a salience threshold; and
inserting an identifier of the first entity into a listing of entities that are present and salient to the scene.

8. An apparatus, comprising:
one or more processors;
memory storing executable instructions configured to, with the one or more processors, cause the apparatus to:
identify a set of entities in video content;
for a scene in the video content, identify a first confidence value vector that is representative of features of the scene and that is a result of a video recognition process;
for the scene, identify a second confidence value vector that is representative of features of the scene and that is a result of an audio recognition process; and
based on the first confidence value vector and the second confidence value vector, determine at least one identifier that defines whether an entity in the set of entities is present in the scene.

9. The apparatus of claim 8, wherein the executable instructions are configured to, with the one or more processors, cause the apparatus to:
identify a plurality of shots in the video content;
create a lattice of nodes that comprises at least one of a scene boundary node or a non-scene boundary node for each shot in the plurality of shots, wherein the lattice of nodes defines a plurality of paths beginning at a first shot of the plurality of shots and ending at a last shot of the plurality of shots;
rank the plurality of paths; and
select, based on the rank, which one of the plurality of paths is to define where boundaries of the scene are located in the video content.

10. The apparatus of claim 9, wherein creating the lattice of nodes comprises:
calculating a probability that a current shot is a scene boundary;
calculating a probability that the current shot is a non-scene boundary; and
inserting the at least one of the scene boundary node or the non-scene boundary node into the lattice based on the probability that the current shot is a scene boundary and the probability that the current shot is a non-scene boundary.

11. The apparatus of claim 8, wherein the video recognition process comprises a face recognition process, wherein the audio recognition process comprises a voice recognition process, wherein at least one confidence value of the first confidence value vector defines a probability that a face of an entity in the set of entities is present, and wherein at least one confidence value of the second confidence value vector defines a probability that a category of phone is being uttered by an entity in the set of entities.

12. The apparatus of claim 8, wherein the executable instructions are configured to, with the one or more processors, cause the apparatus to:
calculate acoustic features from audio of the video content;
detect an occurrence of a phone based on the acoustic features;
determine a plurality of confidence values for each entity in the set of entities, wherein at least one value in the plurality of confidence values defines a probability that the phone belongs to one of a plurality of phone categories; and
determine the second confidence value vector from the plurality of confidence values for each entity in the set of entities, wherein a first value of the second confidence value vector is selected from a first plurality of confidence values for a first entity in the set of entities.

13. The apparatus of claim 12, wherein determining the plurality of confidence values for each entity in the set of entities comprises calculating the first plurality of confidence values for the first entity using a set of mixture models, wherein each model in the set of mixture models calculates a probability that an input phone belongs to a phone category pronounced by the first entity, and wherein each model in the set of mixture models corresponds to one of the plurality of phone categories.

14. The apparatus of claim 8, wherein the executable instructions are configured to, with the one or more processors, cause the apparatus to:
for the scene, determine a plurality of salience measurements, wherein each of the plurality of salience measurements corresponds to a different entity in the set of entities, and a first measurement in the plurality of salience measurements numerically indicates importance of a first entity to the scene;
determine that the first measurement satisfies a salience threshold; and
insert an identifier of the first entity into a listing of entities that are present and salient to the scene.

15. A method comprising:
performing feature recognition on video content using a at least a video recognition technique and an audio recognition technique, which results in feature information for the video content;
determining, based on a selection of a path from a plurality of possible paths through a node lattice that comprises at least one of a scene boundary node or a non-scene boundary node for each shot in the video content, defining boundaries of a scene in the video content;
identify, from the feature information, a set of confidence value vectors for the scene that comprises a first confidence value vector for the video recognition technique and a second confidence value vector for the audio recognition technique; and
identify one or more items present in the scene based on the set of confidence value vectors.

16. The method of claim 15, further comprising:
creating the node lattice;
ranking the plurality of possible paths through the node lattice; and
selecting the path based on the ranking.

17. The method of claim 15, wherein the video recognition technique comprises a face recognition technique, wherein the audio recognition technique comprises a voice recognition technique, wherein at least one confidence value of the first confidence value vector defines a probability that a face is present, and wherein at least one confidence value of the second confidence value vector defines a probability that a category of phone is being uttered.

18. The method of claim 17, further comprising:
performing the voice recognition technique by at least
- calculating acoustic features from audio of the video content,
- detecting an occurrence of a phone based on the acoustic features,
- determining a plurality of confidence values, wherein at least one value in the plurality of confidence values defines a probability that the phone belongs to one of a plurality of phone categories, and
- determining the second confidence value vector from the plurality of confidence values.

19. The method of claim 18, wherein determining the plurality of confidence values comprises calculating the plurality of confidence values using a set of mixture models, wherein each model in the set of mixture models calculates a probability that an input phone belongs to a phone category, and wherein each model in the set of mixture models corresponds to one of the plurality of phone categories.

20. The method of claim 15, further comprising:
- determining a plurality of salience measurements, wherein a first measurement in the plurality of salience measurements numerically indicates importance of a particular item of the one or more items to the scene;
- determining that the first measurement satisfies a salience threshold; and
- storing an identifier of the particular item into a listing of item identifiers that are present and salient to the scene.

* * * * *

UNITED STATES PATENT AND TRADEMARK OFFICE
CERTIFICATE OF CORRECTION

PATENT NO. : 8,849,041 B2
APPLICATION NO. : 13/487543
DATED : September 30, 2014
INVENTOR(S) : Jan Neumann et al.

It is certified that error appears in the above-identified patent and that said Letters Patent is hereby corrected as shown below:

In the Specification

Column 15, Detailed Description, Line 22:
    Please delete "P," and insert --$P_n$--

In the Claims

Column 26, Claim 15, Line 47:
    After "using", delete "a"

Column 26, Claim 15, Line 54:
    After "content,", insert --data--

Signed and Sealed this
Second Day of June, 2015

Michelle K. Lee
*Director of the United States Patent and Trademark Office*